US012249012B2

(12) United States Patent
Ma et al.

(10) Patent No.: US 12,249,012 B2
(45) Date of Patent: Mar. 11, 2025

(54) VISUAL REPRESENTATION USING POST MODELING FEATURE EVALUATION

(71) Applicant: INTERNATIONAL BUSINESS MACHINES CORPORATION, Armonk, NY (US)

(72) Inventors: Xiao Ming Ma, Xi'an (CN); Wen Pei Yu, Xian (CN); Jing James Xu, Xi'an (CN); Xue Ying Zhang, Xi'an (CN); Si Er Han, Xi'an (CN); Jing Xu, Xi'an (CN); Jun Wang, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 18/056,389

(22) Filed: Nov. 17, 2022

(65) Prior Publication Data

US 2024/0169614 A1 May 23, 2024

(51) Int. Cl.
*G06T 11/00* (2006.01)
*G06T 11/20* (2006.01)

(52) U.S. Cl.
CPC .................. *G06T 11/206* (2013.01)

(58) Field of Classification Search
CPC .......... G06F 18/23; G06F 17/18; G06F 16/26; G06F 18/20; G06F 18/213; G06F 18/2113; G06F 18/2115; G06T 11/206; G06T 2200/24; G06T 11/203
See application file for complete search history.

(56) References Cited

FOREIGN PATENT DOCUMENTS

EP 3825926 A1 5/2021

OTHER PUBLICATIONS

Matthew Britton, VINE: Visualizing Statistical Interactions in Black Box Model, retrieved from https://arxiv.org/abs/1904.00561, Apr. 1, 2019 (Year: 2019).*
Au et al., "Grouped Feature Importance and Combined Features Effect Plot," arXiv:2104.11688v1 [stat.ML] Apr. 23, 2021, https://arxiv.org/pdf/2104.11688.pdf, 43 pages.
Author Unknown, "Partial Dependence and Individual Conditional Expectation Plots," Scikit-Learn, Accessed: Sep. 16, 2022, https://scikit-learn.org/stable/auto_examples/inspection/plot_partial_dependence.html?highlight=pdp#sphx-glr-download-auto-examples-inspection-plot-partial-dependence-py, 6 pages.
(Continued)

*Primary Examiner* — Hau H Nguyen
(74) *Attorney, Agent, or Firm* — Lily Neff (57) ABSTRACT

A method, computer system, and a computer program product are provided for post-modeling feature evaluation. In one embodiment, at least at least one post model visual output and associated data is obtained that at least includes an individual conditional expectation (ICE) plot and a partial dependence (PDP) plot. Using the associated data and the plots, a Feature Importance (PI) plot is provided. A plurality of features is then determined for each PI, PDP and ICE plots to calculate at least one Interesting Value for each plot. An overall score is also calculated for each plurality of features based on the associated Interesting Values for each PDP, ICE and PI plots. At least one top feature is selected based on said scores. A final plot is then generated at least reflecting the top feature. The final plot combines the PI, PDP and ICE plots together.

20 Claims, 6 Drawing Sheets

(56) References Cited

OTHER PUBLICATIONS

Casalicchio et al., "Visualizing the Feature Importance for Black Box Models," arXiv:1804.06620v3 [stat.ML] Dec. 28, 2018, https://arxiv.org/pdf/1804.06620.pdf, 16 pages.

Fisher et al., "Model Class Reliance: Variable Importance Measures for any Machine Learning Model Class, from the "Rashomon" Perspective,", arXiv:1801.01489v2 [stat.ME] Feb. 23, 2018, https://arxiv.org/pdf/1801.01489v2.pdf, 38 pages.

Goldstein et al., "Peeking Inside the Black Box: Visualizing Statistical Learning with Plots of Individual Conditional Expectation," arXiv:1309.6392v2 [stat.AP] Mar. 20, 2014, https://arxiv.org/abs/1309.6392, 22 pages.

On, "Model-Agnostic Local Explanations using Individual Conditional Expectation (ICE) Plots," Towards Data Science, Jul. 15, 2020, https://towardsdatascience.com/how-to-explain-and-affect-individual-decisions-with-ice-curves-1-2-f39fd751546f, 11 pages.

* cited by examiner

| Gradient | Intercept | Num Of Turning Point | Mean |
|---|---|---|---|
| 0.43 | -0.1 | 2 | 0.12 |

Table 350

Interesting Value = |*Gradient*| + | *TP /Max TPs(F1, F2, ... Fn)*|

FIG. 3

Table 410

| Gradient | Intercept | Num Of Turning Point | Mean |
|---|---|---|---|
| 0.43 | -0.1 | 2 | 0.12 |
| 0.23 | -0.2 | 0 | 0.15 |
| 0.47 | -0.12 | 3 | 0.13 |
| ... | ... | ... | ... |
| 0.21 | -0.08 | 0 | 0.16 |

ICE Extracted Traits cluster

| Gradient | Intercept | Num Of Turning Point | Mean | cluster |
|---|---|---|---|---|
| 0.43 | -0.1 | 2 | 0.12 | 1 |
| 0.23 | -0.2 | 0 | 0.15 | 2 |
| 0.47 | -0.12 | 3 | 0.13 | 1 |
| ... | ... | ... | ... | ... |
| 0.21 | -0.08 | 0 | 0.16 | 2 |

Table 420

FIG. 4

Table 520

| Gradient | Intercept | Num Of Turning Point | Mean | cluster |
|---|---|---|---|---|
| 0.43 | -0.1 | 2 | 0.12 | 1 |
| 0.23 | -0.2 | 0 | 0.15 | 2 |
| 0.47 | -0.12 | 3 | 0.13 | 1 |
| ... | ... | ... | ... | ... |
| 0.21 | -0.08 | 0 | 0.16 | 2 |

Table 530

|  | Average Gradient | Average Intercept | Average TP | Average Mean |
|---|---|---|---|---|
| cluster 1 | 0.21 | -01 | 1 | 0.12 |
| cluster 2 | 0.33 | -03 | 0 | 0.15 |
| cluster 3 | 0.42 | -0.2 | 2 | 0.13 |

Interesting Value = |Var(Average Gradient)| +
|Var(Average Intercept)| +
|Var(Average TP)| +
|Var(Average Mean)| +
| cluster Num/Max cluster Num (F1, F2, ... Fn)|

VISUAL REPRESENTATION USING POST MODELING FEATURE EVALUATION

BACKGROUND

The present invention relates generally to the field of digital data management, and more particularly to techniques for using machine modeling to provide single visual representation based on importance of feature evaluation.

Machine learning (ML) algorithms such as neural networks and support vector machines (SVM) may often be considered to produce black box models. Unfortunately, these do not provide any direct explanation for their predictions. Nonetheless, these methods often outperform simple linear models or decision trees in predictive performance as they may be able to model complex relationships in the data. Trees and linear models may still be preferred in areas such as life sciences and social sciences due to their simplicity and interpretability.

In recent years, some development has been made to use model-agnostic interpretability tools to improve the transparency and interpretability of machine learning models. Some of these include tools that enable visualization features and include partial importance (PI), individual conditional importance (ICI), partial dependence (PD) and individual conditional expectation (ICE) plots or other forms of visualization outputs. Combining them may be useful to limit some of the shortcomings but these plots may be very complex and difficult to combine.

SUMMARY

Embodiments of the present invention disclose a method, computer system, and a computer program product for post-modeling feature evaluation. In one embodiment, at least at least one post model visual output and associated data is obtained that at least includes an individual conditional expectation (ICE) plot and a partial dependence (PDP) plot. Using the associated data and the plots, a Feature Importance (PI) plot is provided. A plurality of features is then determined for each PI, PDP and ICE plots to calculate at least one Interesting Value for each plot. An overall score is also calculated for each plurality of features based on the associated Interesting Values for each PDP, ICE and PI plots. At least one top feature is selected based on said scores. A final plot is then generated at least reflecting the top feature. The final plot combines the PI, PDP and ICE plots together.

BRIEF DESCRIPTION OF THE SEVERAL VIEWS OF THE DRAWINGS

These and other objects, features and advantages of the present invention will become apparent from the following detailed description of illustrative embodiments thereof, which may be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
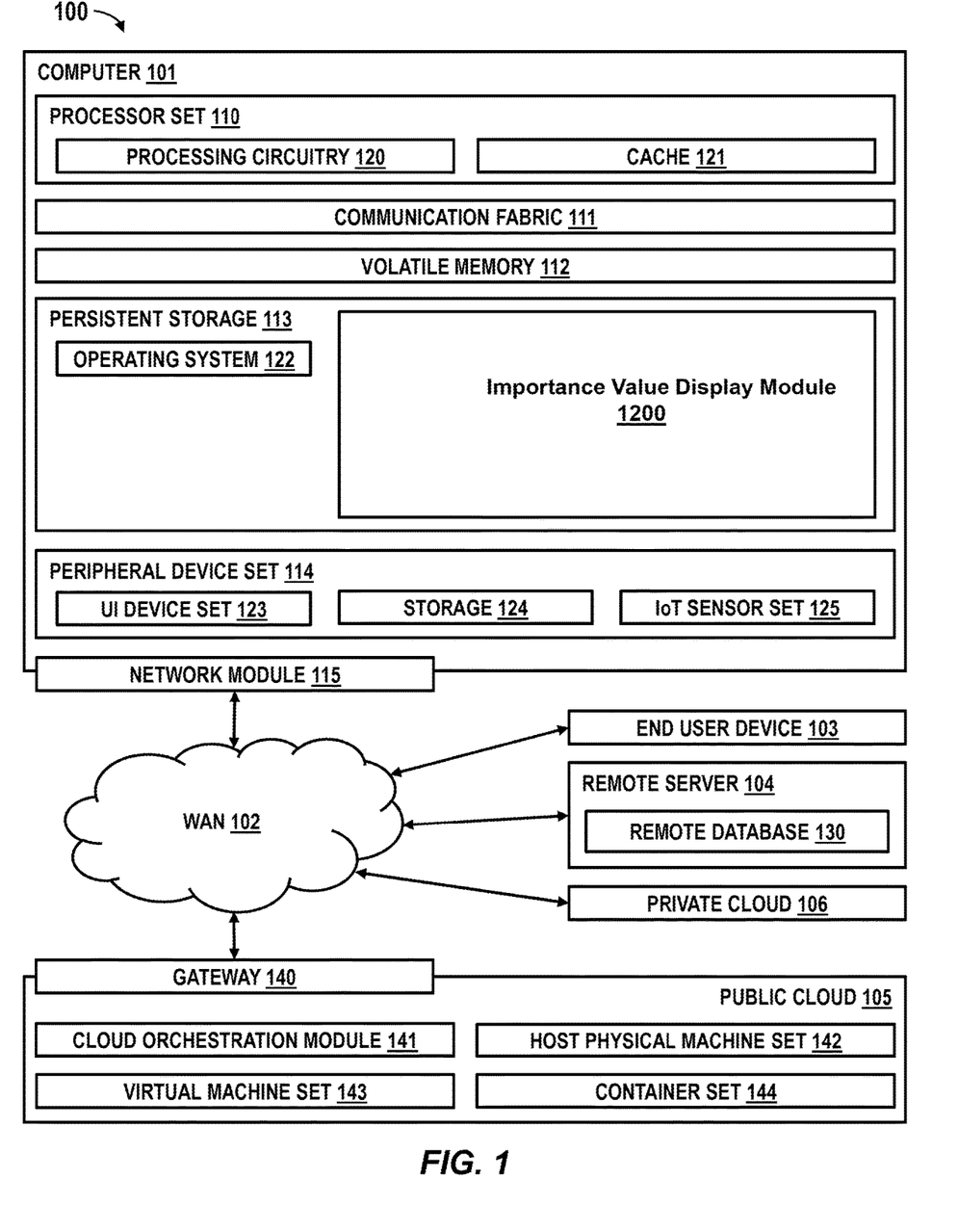
FIG. 1 illustrates a networked computer environment according to at least one embodiment.

FIG. 1 provides a block diagram of a computing environment 100. The computing environment 100 contains an example of an environment for the execution of at least some of the computer code involved in performing the inventive methods, such as code change differentiator which is capable of providing an importance value display module (1200) using post modeling feature evaluation. In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
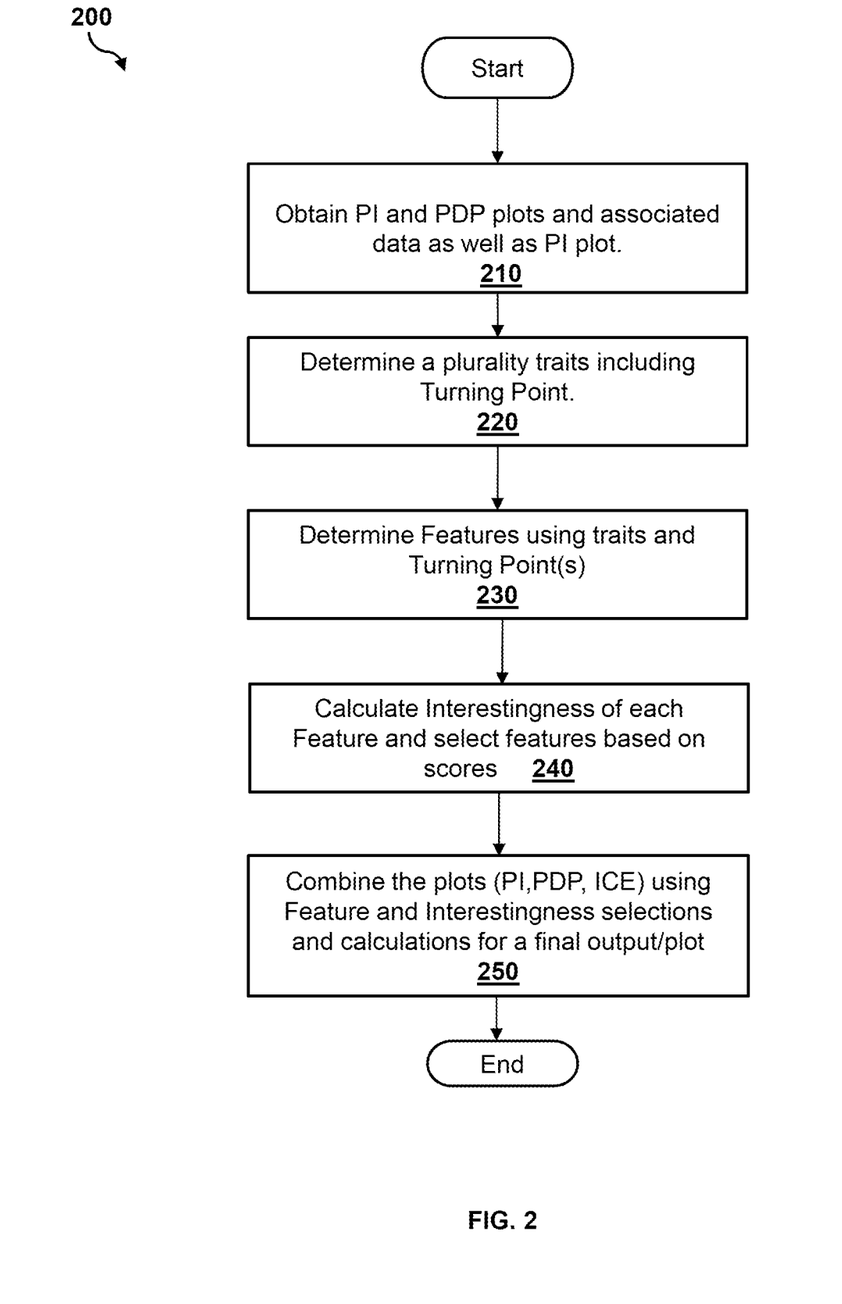
FIG. 2 provides an operational flowchart for combining a plurality of different visualization outputs and associated data according to one embodiment.

FIG. 2 provides a flowchart depiction of a process 200 that can analyze different visualization outputs and combined them into a one based on importance of features. Process 200 provides for a way to combine a plurality of different visualization outputs, namely graphs and plots, and decide which features are best selected for understanding different relationships to provide a predictive outcome.

A Partial dependence plots (PDP) provides a visual tool that illustrates the relationship (dependence) between a target response and a set of input features of interest that may be marginalizing over the values of all other input features (the 'complement' features). In other words, these plots show the partial dependence of an expected target response as a function of the input features of interest.

PDP plots may provide information about the interaction between the target response and an input feature of interest feature (e.g., linear, non-linear). For example, two independent plots (non-PDP) may exist where one may be concerned with the effect of the average occupancy on the median house price. This may include a linear relationship between average occupancy of less than a threshold and the medium house price. A second plot can analyze the effect of the house age on the median house price.

The two plots may be combined into a PDP plot, having the two input features of interest show the interactions among these two features. For example, a two-variable PDP can be created showing the dependence of median house price on joint values of house age and average occupants per household. This may lead to a clear conclusion that for example for an average occupancy greater than two, the house price is nearly independent of the house age, whereas for values less than 2 there is a strong dependence on age.

Due to the limits of human perception the size of the set of input features of interest must be small (usually, one or two) thus the input features of interest chosen may be very important and selection should be limited to the most important features.

Similar to a PDP, an individual conditional expectation (ICE) plot shows the dependence between a target function and an input feature of interest. However, unlike a PDP, which shows the average effect of the input feature, an ICE plot visualizes the dependence of the prediction on a feature for each sample separately with one line per sample. While the PDPs may be good at showing the average effect of the target features, they may obscure a heterogeneous relationship created by interactions. When interactions may be present the ICE plot may provide more insights in providing a predictive outcome.

In addition, a Feature Importance (PI) plot can also be provided. Feature importance methodology has been used to interpret a predictive model. Usually, a plurality of input values may be disposed, such as in a matrix or table. The input values indicate the relative contribution of the dataset features to the predictions generated by the model. Each feature may be a variable or column that may be used as an input to make a prediction, which may be assigned a value, known as the feature importance. The feature importance indicates how much the variable impacts a future prediction. For example, the features may be ranked from highest to lowest by feature importance, to gain a better insight into a how a model may be used to make predictions. The model's predictions may be more sensitive to changes in features with higher importance. For example, in a streaming-video service, a model that predicts whether a customer may be going to perform in an expected manner may have a high dependence on the history of the number of hours watched during the weekends. On the Artificial Intelligence (AI) and in one embodiment an Analytics Engine, feature importance can be generated once a classification or regression model has been trained, and can be accessed from the model's summary page, under Insights. Also, the AI and Analytics Engine can generate the feature importance values irrespective of the algorithm chosen for training.

The challenge in model design and building when several visual outputs such as plots need to be combined especially may be the selection of feature importance to be shown. For example, displaying only one value for each feature may not be sufficient. Providing additional information about relation of feature and target may be useful for users to understand and use the to be designed model. For example, the PDP (also known as PD plots) may show the marginal effect of one or two features on a predicted outcome of a machine learning model. This would be sufficient to determine whether the relationship between the target and a feature may be linear, monotonic or more complex. However, this model does not focus on specific instances and in-stead on an overall average.

Combining different models like PI to PDP and ICE, will provide a much more detailed predictive outcome with needed feature. However, the amount of information to process is difficult and selection of which features to display may be challenging. As discussed earlier, process 200 provides a technique for a post-modeling feature(s) evaluation and visualization which in one embodiment, combines PI, PDP, ICE plot modeling in a manner that provides a final output with detailed features (insights) for easy understanding.

In Step 210 visual outputs and their associated may be obtained. The visual outputs may provide at least a PDP and ICE plot for the associated data. Using the information and associated data a PI model can be obtained.

In Step 220, a plurality of traits may be identified for each PDP/ICE plot. In one embodiment, for the PDP/ICE lines associated with any Turning Point(s) (TP) may be determined (such as by a using a TP algorithm). A Turning Point may be a point at which a direction of $(X_i, TC_i)$ series changes (TC is PDP or ICE value). This may be provided more clearly in FIG. 3 (Turning Point shown at 310). It should be noted that a Turning Point may not be available for every plot, but when there may be one or more provided, the Turning Point may be used in determination of other characteristics and trends.

Figure 3:
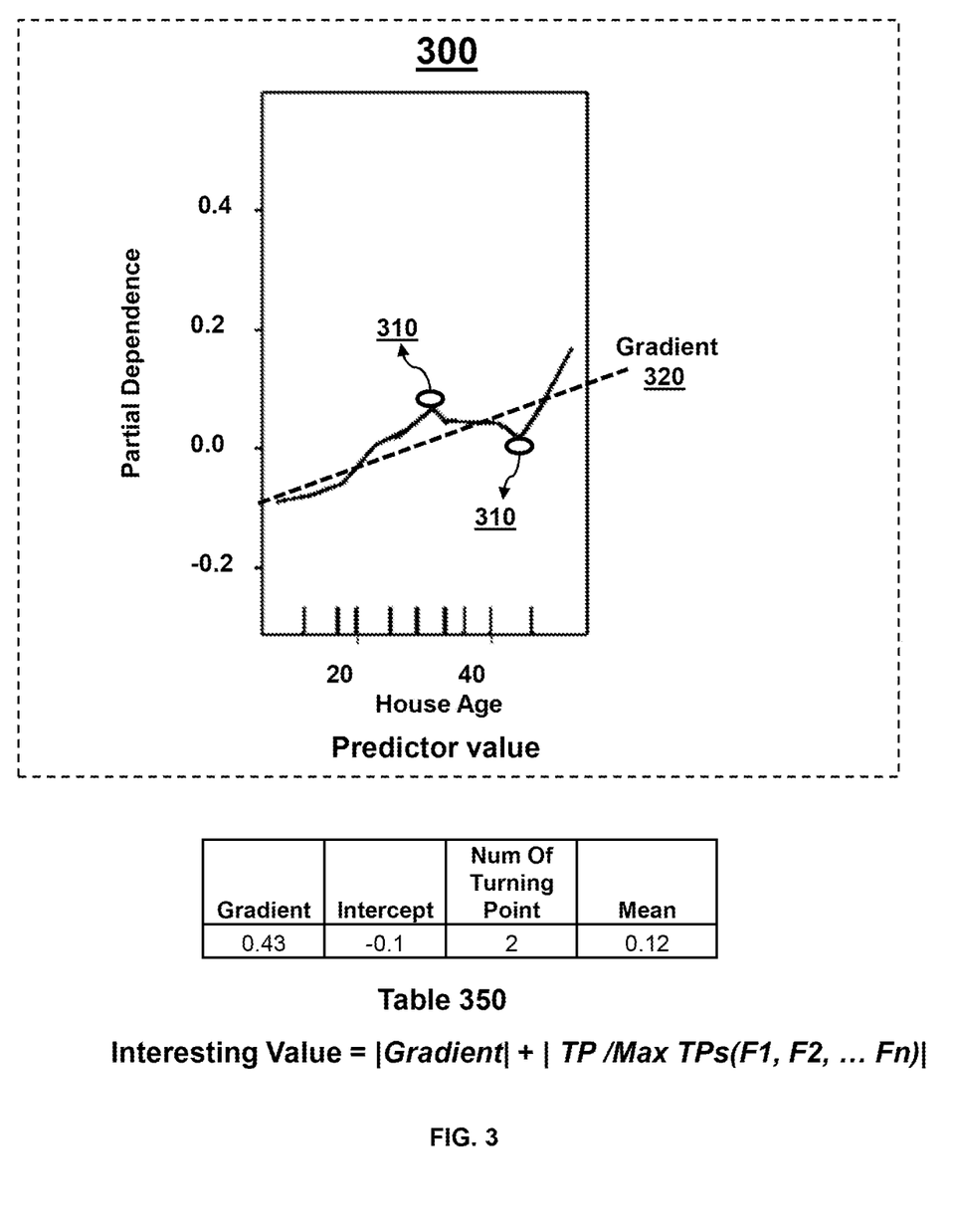
FIG. 3 provides a graphical illustration of Turning Point determination for a PDP plot according to an embodiment.

To calculate a Turning Point, some points along the plot/graph (and associated data) may be selected. This can be provided as:

$X_1, X_2, \ldots, X_m$ at which the trend direction changes, i.e., a point $X_i$ satisfies one of the following conditions:

$$TC_{x_{i-1}} - TC_{x_i} \leq 0 \text{ and } TC_{x_i} - TC_{x_{i+1}} > 0 \qquad \text{i)}$$

$$TC_{x_{i-1}} - TC_{x_i} \geq 0 \text{ and } TC_{x_i} TC_{x_{i+1}} < 0 \qquad \text{ii)}$$

In one embodiment, the noise points should be removed—or delete the candidate turning point $x_i$ if $x_{i+1} - x_i \leq 2$.

Subsequently, a step may be conducted in some embodiments to refine or identify a starting point of decrease (or increase). For example, for a candidate turning point $x_i$ at which the trend starts to decrease (increase), adjustment should be made for it to $x_i$ if the original TC value at $x_i$ reach the maximum (minimum) in the interval $[x_i-2, x_i+2]$.

It should be noted that efforts should be made to ensure that the real point at peak/bot-tom may be obtained. To ensure that $-t_0=1$ and $x_{m+1}=n$. At each candidate turning point $x_i$, if the following two conditions hold, then $x=x_i$ is a turning point.

$$\frac{|TC_x - TC_{x_{i+1}}|}{|TC_{x_i}|} \geq c_1 \% \text{ or } \frac{|TC_{x_i} - TC_{x_{i-1}}|}{|TC_{x_{i-1}}|} \geq c_1 \%, \qquad \text{i)}$$

where the default values for $c_1$ is 20.

ii) $x_{i+1} - x_i \geq c_2$ and $x_i - x_{i-1} \geq c_3$, where the default values for $c_2$ and $c_3$ are 5 respectively.

The Output will then be the Turning point $X_i$ as shown in FIG. 3.

Besides the Turning Point, the gradient and Intercept is also calculated. This can be calculated in a variety of ways such as calculate the line:

$$y = aX + b$$

with least square method based on PDP or ICE value as y; feature value as X, then gradient=a, intercept=b In Step 230, the features, such as the PDP and ICE lines may be extracted. The features may be determined using the identified traits, in one embodiment. An ICEs plot usually provides a variety of closely disposed lines, often considered clusters. The clusters can be extracted to provide additional information about the traits.

Figure 4:
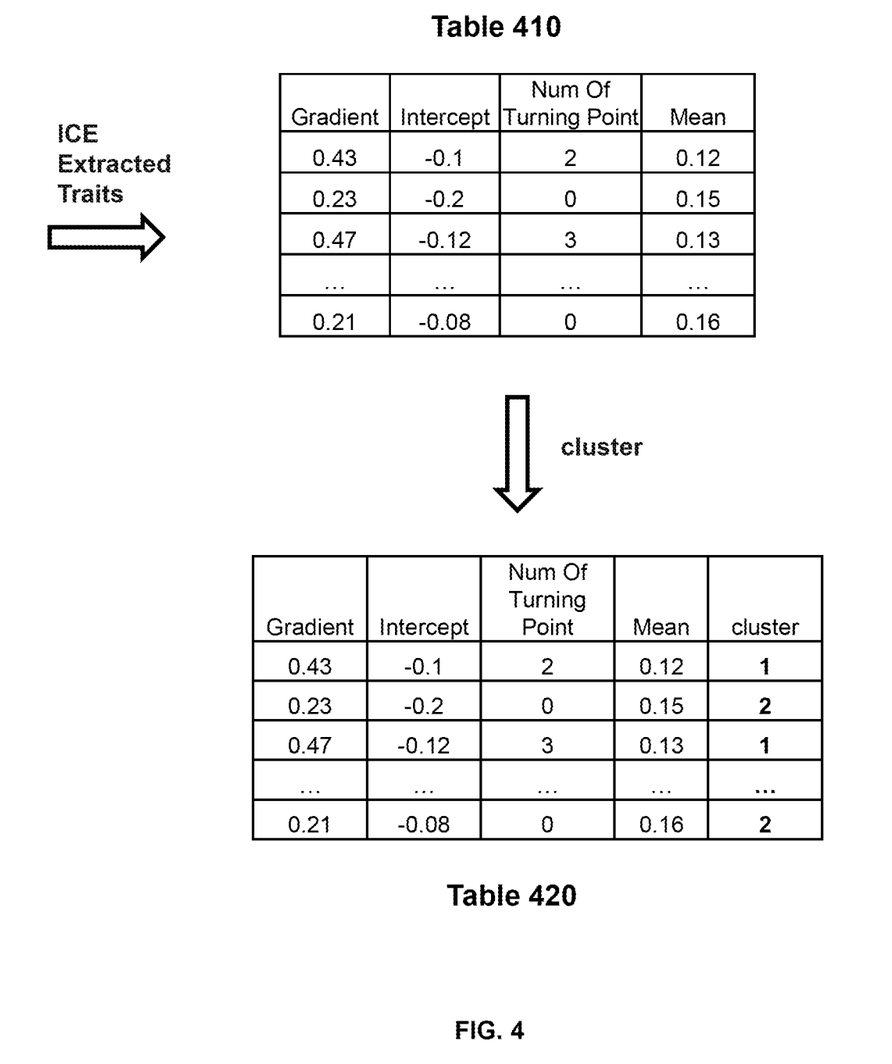
FIG. 4 is an example of extracted features and ranking of an ICE plot model and associated data according to an embodiment.

FIGS. 3 and 4 provide examples where the traits of PDP and ICE lines may be extracted respectively. In FIG. 3, the gradient, Intercept and Number of Turning points (when there are any available) and the Mean may be calculated and reflected in Table 350, using a PDP graph 300 as shown. In FIG. 4 a similar table may be generated using an ICE plot and model.

The example of FIG. 3 can be used to illustrate how the number of turning points (and if there may be any available) can be seen and calculated. In the example of FIG. 3, there are two turning points as shown at 310 and the gradient of the lines may be shown at 320. As discussed, the plot and Turning Point information may then be used to generate Table 350. In this example, as mentioned, there are two turning points and the value of the gradient calculated is 0.43 and the intercept occurs at −0.1 and the Mean is at 0.12. In this embodiment the |Gradient|+|TP/Max TPs(F1, F2, . . . Fn)| may be used to provide an Interesting value based on traits.

Referring back to FIG. 2, in Step 240, an overall score may be calculated for each feature based on traits of PDP, ICE and PI. Using these scores interestingness may be also determined for each feature. The top scores are then selected (as high interesting ones on demand).

In order to compute overall interestingness of feature, a variety of ways can be used as can be appreciated by one skill in the art. In one embodiment, PI, PDP and ICE can be normalized for each feature. The following formulas can be used as an example as provided below:

For PI;

$$\text{NormalizedPI}_i = \text{PI}_i / \text{Max PI}(F1, F2, F3 \ldots Fn)$$

For PDP; and $$\text{NormalizedPDP}_i = \text{PDP}_i / \text{Max PDP}(F1, F2, F3 \ldots Fn)$$

For ICE $$\text{NormalizedICE}_i = \text{ICE}_i / \text{Max ICE}(F1, F2, F3 \ldots Fn)$$

Subsequently, a total Interestingness can be calculated. For example, one scenario is provided below:

Total Interestingness=50%*Normalized PI+20% Normalized PDP+30% Normalized ICE Weight(0.5, 0.2,0.3) could be specified by user with business needs In Step 250, the information from PI, PDP and ICE models may be combined to show insights of feature evaluation. A final visual output (in this case a final plot) is then generated. In one embodiment, prior to the generation of the final plot, a sampling step is performed. In this embodiment the ICEs may be sampled and displayed based on cluster result to show clearness relation against target when the feature changes. This allows the advantage of combining PI, PDP, ICE to show insights of feature evaluation. It also allows providing quantitative methods to guide a user understand their wide/large data, including Turning point calculation, traits of PDP/ICE, interesting value. This can be achieved by providing a simple visual plot at the end that allows for traits to be seen clearly. A final model and associated graph can be provided with selected features for the user.

Figure 6:
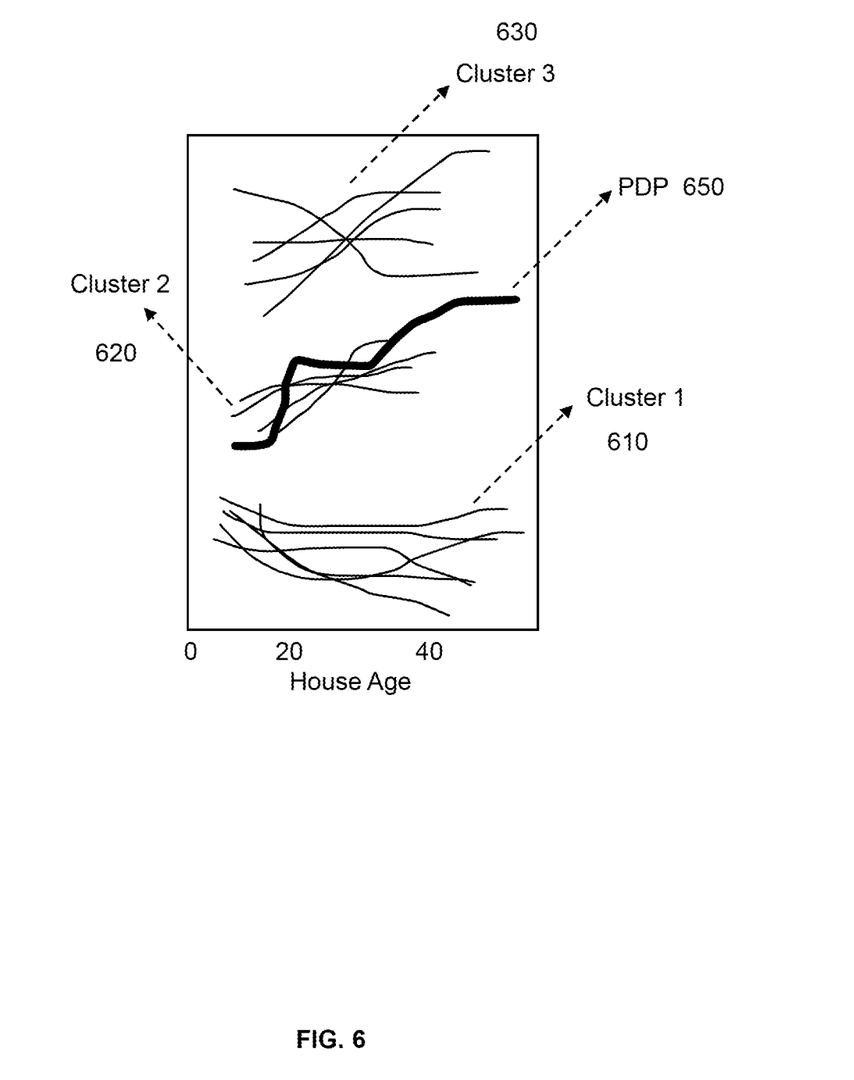
FIG. 6 is an example of an ICE plot showing different clusters and a final PDP graph, according to an embodiment.

In one embodiment, a final plot that will be provided to a user, can be an ICE plot that is simplified to show its traits clearly. In one embodiment, it may reflect sample lines to show each cluster ratio and have a final, more understandable graph. FIG. 6 provides such as process as per one embodiment.

Figure 5:
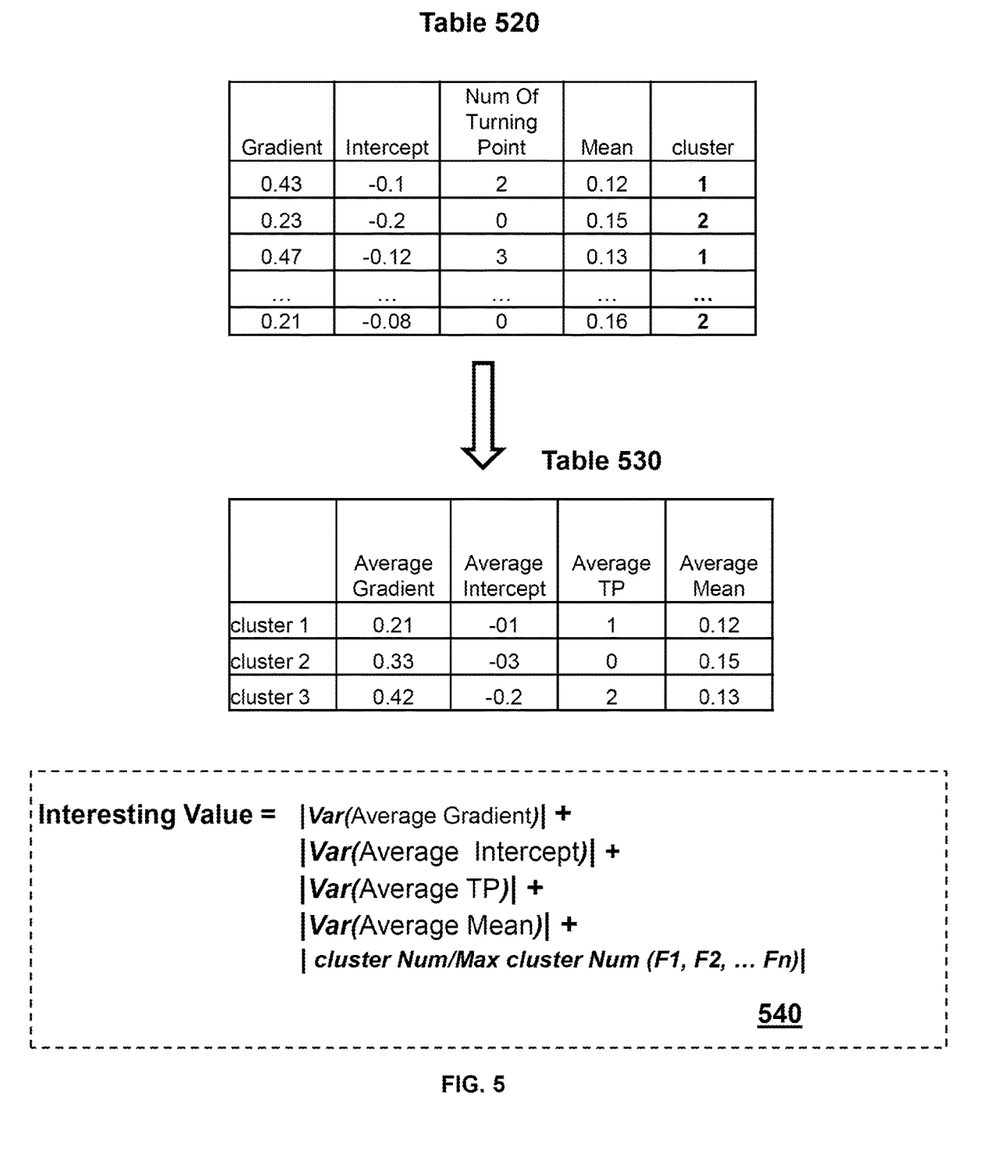
FIG. 5 is an example of Interesting value determination as per example provided in embodiment of FIG. 4 according to an embodiment.

FIGS. 4 through 6 provide the different calculation steps performed as discussed earlier to generate the final plot.

FIG. 4, provides the traits and features may be extracted from an ICE plot (not shown) similar to that shown in FIG. 3 for the PDP plot and associated data. In FIG. 4, the results may be calculated and generated to provide the sample Table 410. As indicated in this table, some sample values (similar to Table 350 in FIG. 4) are provided. To be consistent with FIG. 3, the values reflected in Table 410—namely the gradient, intercept, and mean. The number of Turning Points (when present) may be also indicated. A cluster table 420 can then be derived having cluster values.

FIG. 5 provides a block diagram showing a next step processing illustration of the graph of FIG. 4 in relation to an ICE plot. Table 420 of FIG. 4 may be reproduced here as Table 520. Subsequent to that another table may be generated that provide more details about the different features of each cluster. This may be illustrated by Table 530. The Interesting value calculation may be shown in the box 540 using Table 530.

As indicated before, FIG. 6 provides a graphical representation of a final plot. In this example, the final plot may be represented as an ICE plot. The different clusters are shown as clusters 1, 2 and 3 and associated numerals 610, 620 and 630. A PDP plot may also be shown at 650.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for post-modeling feature evaluation, comprising:

obtaining at least one post model visual output and associated data, wherein said visual output includes at least an individual conditional expectation (ICE) plot and a partial dependence (PDP) plot; wherein an ICE plot provides a target value of a particular instance that corresponds to a change in a feature value, and a PDP plot provides a dependency correlation between one or more features on a target value;

using said associated data and said plots, providing a future importance (PI) plot; wherein said PI plot includes a plurality of input values indicating a relative contribution of a dataset on a future generated prediction;

determining a plurality of features for each PI, PDP and ICE plots to calculate at least one Interesting Value for each plot;

determining a turning point (TP) associated with the PDP and ICE plots, wherein said TP is identified by a starting point of a decrease or alternatively an increase on each of said PDP and ICE plots;

calculating an overall score for each plurality of features based and their associated Interesting Values for each PDP, ICE and PI plots and by values associated with the TP;

selecting at least one top feature based on said scores; and generating a final plot by combining PI, PDP and ICE plots based on said at least one top feature.

2. The method of claim 1, wherein said features for at least said PDP and ICE plots are determined by extracting a plurality of traits and at least one Turning Point associated with each plot.

3. The method of claim 2, wherein using said traits include at least a Gradient, an Intercept and a Mean value calculated for each plot.

4. The method of claim 3, wherein said Interesting Value is calculated based on said calculated traits.

5. The method of claim 3, wherein each feature for said PI, ICE and PDP plots are normalized reflect an overall priority for each feature.

6. The method of claim 3, wherein said ICE plot has a plurality of cluster graphs, and each cluster is ranked in order of a priority based on said trait values.

7. The method of claim 6, wherein said final plot is an ICE plot reflecting each cluster by their ratio and simplified for visualization to show to show at least a particular single trait.

8. A computer system for providing post-modeling feature evaluation, comprising;

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps:

obtaining at least one post model visual output and associated data, wherein said visual output includes at least an individual conditional expectation (ICE) plot and a partial dependence (PDF) plot; wherein an ICE plot provides a target value of a particular instance that corresponds to a change in a feature value, and a PDP plot provides a dependency correlation between one or more features on a target value;

using said associated data and said plots, providing a future importance (PI) plot; wherein said PI plot includes a plurality of input values indicating a relative contribution of a dataset on a future generated predictions;

determining a plurality of features for each PI, PDP and ICE plots to calculate at least one Interesting Value for each plot;

determining a turning point (TP) associated with the PDP and ICE plots, wherein said TP is identified by a starting point of a decrease or increase on each of said PDP and ICE plots;

calculating an overall score for each plurality of features based and their associated Interesting Values for each PDP, ICE and PI plots and by values associated with the TP;

selecting at least one top feature based on said scores; and generating a final plot by combining PI, PDP and ICE plots based on said at least one top feature.

9. The computer system of claim 8, wherein said features for at least said PDP and ICE plots are determined by extracting a plurality of traits and at least one Turning Point associated with each plot.

10. The computer system of claim 9, wherein using said traits include at least a Gradient, an Intercept and a Mean value calculated for each plot.

11. The computer system of claim 10, wherein said Interesting Value is calculated based on said calculated traits.

12. The computer system of claim 10, wherein each feature for said PI, ICE and PDP plots are normalized reflect an overall priority for each feature.

13. The computer system of claim 10, wherein said ICE plot has a plurality of cluster graphs, and each cluster is ranked in order of a priority based on said trait values.

14. The computer system of claim 13, wherein said final plot is an ICE plot reflecting each cluster by their ratio and simplified for visualization to show to show at least a particular single trait.

15. A computer program product for providing post-modeling feature evaluation, comprising:

one or more computer-readable storage medium and program instructions stored on at least one of the one or more tangible storage medium, the program instructions executable by a processor, the program instructions comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps comprising:

obtaining at least one post model visual output and associated data, wherein said visual output includes at least an individual conditional expectation (ICE) plot and a partial dependence (PDP) plot; wherein an ICE plot provides a target value of a particular instance that corresponds to a change in a feature value, and a PDP plot provides a dependency correlation between one or more features on a target value:

using said associated data and said plots, providing a future importance (PI) plot; wherein said PI plot includes a plurality of input values indicating a relative contribution of a dataset on a future generated predictions;

determining a plurality of features for each PI, PDP and ICE plots to calculate at least one Interesting Value for each plot;

determining a turning point (TP) associated with the PDP and ICE plots, wherein said TP is identified by a starting point of a decrease or increase on each of said PDP and ICE plots;

calculating an overall score for each plurality of features based and their associated Interesting Values for each PDP, ICE and PI plots and by values associated with the TP:

selecting at least one top feature based on said scores; and generating a final plot by combining PI, PDP and ICE plots based on said at least one top feature.

16. The computer program product of claim 15, wherein said features for at least said PDP and ICE plots are determined by extracting a plurality of traits and at least one Turning Point associated with each plot.

17. The computer program product of claim 16, wherein using said traits include at least a Gradient, an Intercept and a Mean value calculated for each plot.

18. The computer program product of claim 17, wherein said Interesting Value is calculated based on said calculated traits.

19. The computer program product of claim 17, wherein each feature for said PI, ICE and PDP plots are normalized reflect an overall priority for each feature.

20. The computer program product of claim 17, wherein said ICE plot has a plurality of cluster graphs, and each cluster is ranked in order of a priority based on said trait values and said final plot is an ICE plot reflecting each cluster by their ratio and simplified for visualization to show at least a particular single trait.

\* \* \* \* \*